June 6, 1950     R. W. JENSEN     2,510,472
COOLER AND VALVE THEREFOR
Filed April 16, 1945                       2 Sheets-Sheet 1
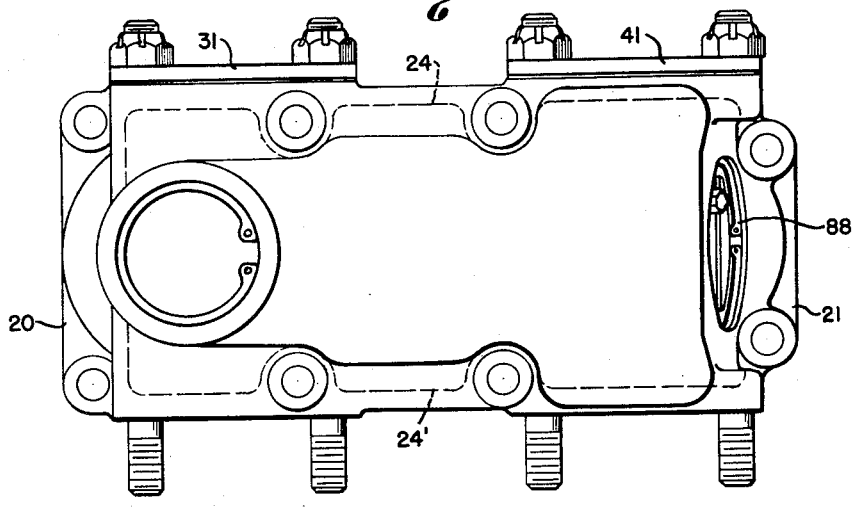
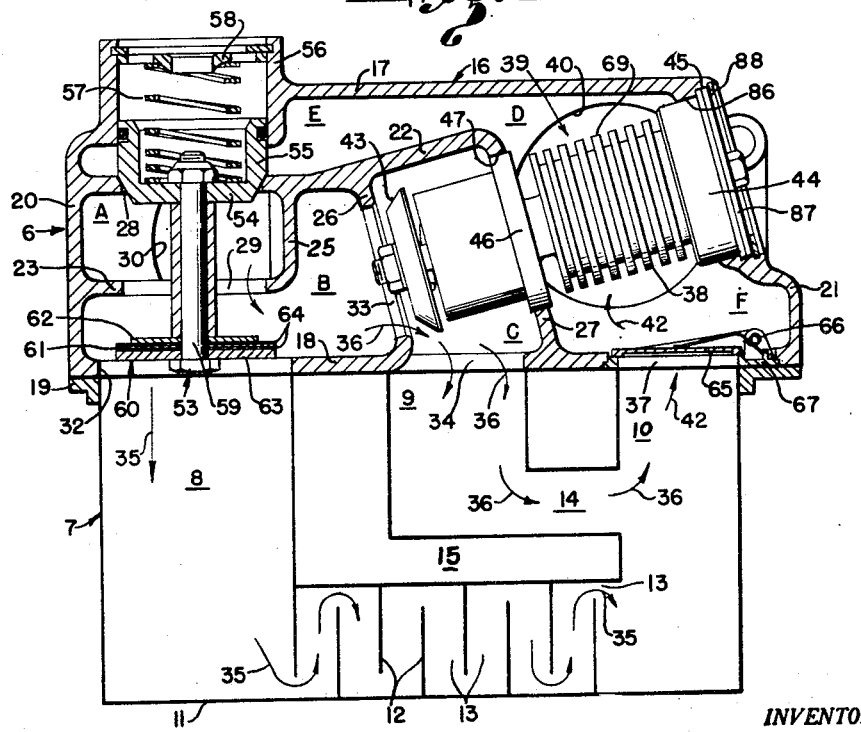
INVENTOR.
RAYMOND W. JENSEN
BY
ATTORNEY

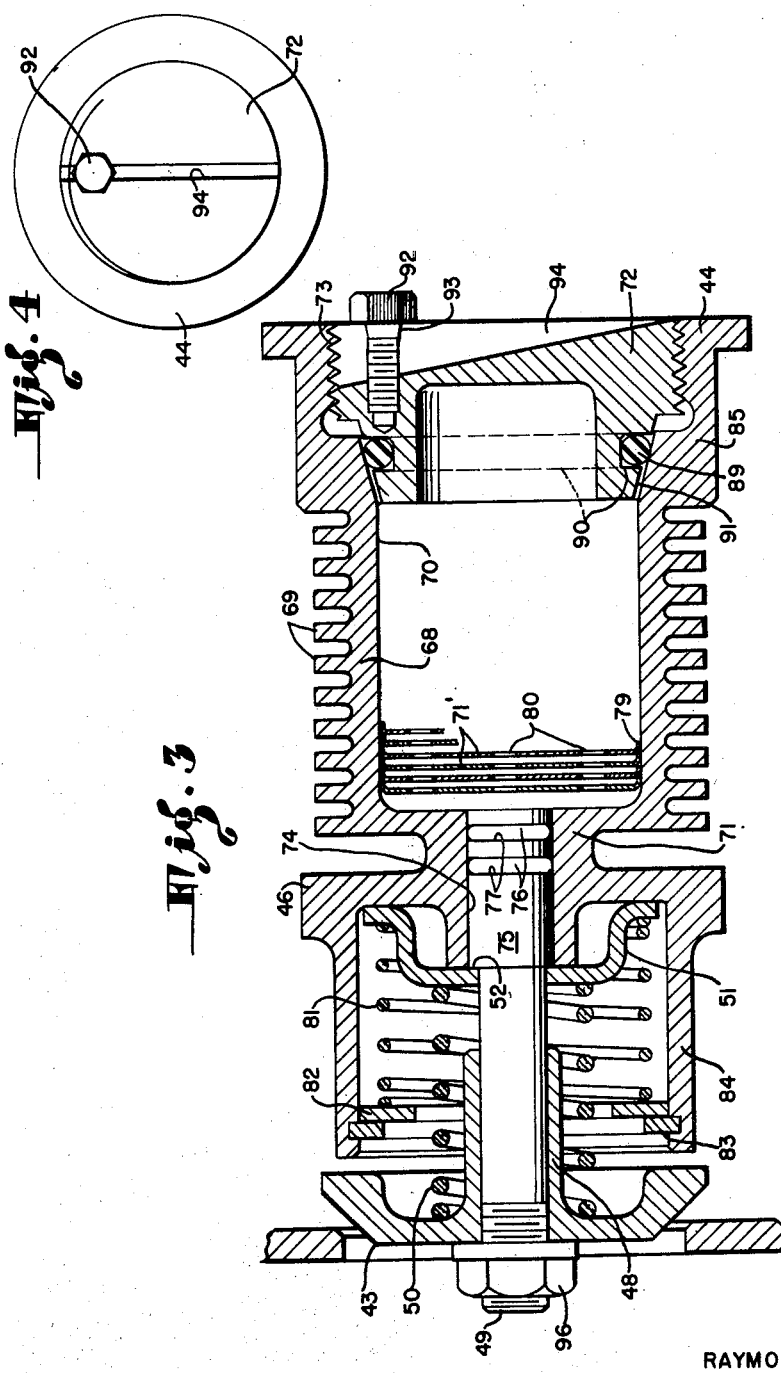

Patented June 6, 1950

2,510,472

UNITED STATES PATENT OFFICE 2,510,472

COOLER AND VALVE THEREFOR

Raymond W. Jensen, Los Angeles, Calif., assignor to The Garrett Corporation, Airesearch Manufacturing Company division, Los Angeles, Calif., a corporation of California Application April 16, 1945, Serial No. 588,591

7 Claims. (Cl. 257—2)

This invention relates to heat exchangers and is particularly useful in connection with the temperature conditioning of lubricating oil for internal combustion engines for aircraft, which are submitted to widely varying conditions of temperature and temperature change. The general object of the invention is to provide an improved temperature control mechanism for heat exchangers, and a particular object of the invention is to provide an improved temperature control mechanism for aircraft oil coolers. Certain subject matter herein disclosed is claimed in applicant's copending divisional application for Cooler and valve therefor, Serial No. 709,949, filed November 15, 1946.

A primary function of an oil cooler is to remove excess heat from the oil as it comes in a heated condition from the engine and to return the oil to the engine in a proper condition of fluidity and viscosity. An aircraft cooler must be capable of faithfully carrying out this function when the temperature of the atmosphere is high (placing a high cooling load on the cooler) and when the temperature of the atmosphere is extremely low (giving rise to the problem of congealment of the oil against the walls of the heat exchange passages of the cooler). It must be capable of handling not only mild variations in temperature, but also such extremes of temperature change.

In general, there have been two lines of development of apparatus for handling these problems. One method of attack is to utilize thermostatic control of the flow of coolant (usually air) through the cooler so as to reduce the cooling effect when atmospheric temperature drops. But it is also highly desirable to utilize temperature control of the oil circulation through the cooler, in connection with suitable means for by-passing a portion or all of the oil around the cooler core when oil viscosity becomes too great, in order to relieve the core of the excessive pressures which are developed as a result of excessive viscosity, and at the same time to reduce the cooling effect and permit the temperature of the oil to rise.

But even further measures are usually considered highly desirable if not essential to the proper control of oil temperature under widely varying conditions. It is possible for the temperature to drop so rapidly or to reach such a low stage, that the thickening of the oil is not arrested even where all of the oil is bypassed through a warm up jacket, and it may become necessary to bypass at least some of the oil directly from the cooler inlet through the cooler outlet or externally of the cooler so as to relieve the warm up jacket as well as the cooler core. The necessity for such shortened bypassing may also arise from sudden surges at the cooler inlet. In connection with such bypassing, it is desirable to isolate the core from the high inlet pressure.

The present invention contemplates a control mechanism having all of these functions and yet embodied in an extremely simple and compact unit. The mechanism is embodied in a control head having a main inlet and a main outlet, a chamber which serves as both an outlet chamber and a direct bypass chamber, a warm up bypass jacket, a thermostatic valve for controlling the flow through a warm up bypass chamber and thus controlling the flow through the warm up jacket, and an inlet chamber together with surge valve mechanism adapted, under excessive pressures and pressure surges to isolate such inlet chamber from its normal connection with the core inlet and to open up a normally closed connection to the direct bypass chamber.

Control mechanisms have previously been developed in which a valve, operated by a thermostat disposed adjacent the cooler outlet in the path of returned oil, was employed to control the flow of oil through parallel outlets from the cooler core and warm up jacket respectively of an oil cooler. In an arrangement of this kind the thermostat is washed by separate streams of oil, one coming from the core outlet and the other coming from the warm up jacket outlet, and these separate streams impinge against different areas of the thermostat, and, furthermore, the effective action on the thermostat in the two areas is not the same.

An important object of the present invention is to provide a cooler control mechanism embodying a thermo-responsive warm up bypass control valve having a thermostat which is arranged for improved accuracy and sensitivity of response to temperature changes. More specifically, the invention aims to provide an arrangement wherein the streams of oil from the warm up bypass and core converge and mix before impinging upon the thermostat, and wherein the thermostat is so arranged with reference to the mixed oil stream that the impingement will have a maximum effect.

Another object is to provide an arrangement wherein the available space within the outlet chamber is devoted entirely to the thermostat so as to permit maximum freedom of access and concentration of the discharging oil stream to and around the thermostat.

A further object of the invention is to provide an arrangement wherein the bypassing of the oil to the warm up jacket is controlled by a combined thermo-responsive and pressure responsive valve unit, at the inlet of the cooler rather than at the outlet as has been customary in the use of such valves in the past. Such an arrangement has the advantage of making the valve responsive to inlet pressure instead of the pressure at the warm up jacket outlet, which is definitely lower than inlet pressure because of the pressure drop through the warm up jacket, and this is especially true under the conditions of high viscosity which require the opening of the bypass to relieve the core.

Another object of the invention is to provide a cooler control mechanism in which the number of valve devices is reduced to a minimum without sacrificing the functions of previous control mechanisms containing a larger number of valve devices.

The foregoing objects are attained by the invention in an arrangement wherein the thermostat occupies the outlet chamber and the valve which is controlled by the thermostat occupies a separate chamber in the control housing, and operates at the inlet rather than at the outlet of the cooler as in prior devices. This makes it possible to concentrate the entire discharge flow upon the thermostat. It also makes it possible to arrange the thermostat and valve unit in a position substantially parallel to the longitudinal axis of the cooler (thus permitting the height of the control housing to be reduced to a minimum) and at the same time to employ a valve unit of ample length. To illustrate these latter points, it may be noted that with the thermostat arranged in the outlet chamber and the valve element arranged in an intermediate chamber (comprising the separate connection to the warm up jacket), the valve unit may occupy roughly two thirds of the length of the control housing, since the only additional chamber required is the inlet chamber. At the same time, it is possible to arrange all three chambers "in line" so as to keep the width of the control housing at a minimum. Furthermore, with the valve unit "lying on its side" so to speak, the direct bypass chamber from the inlet to the outlet may be and is arranged above the intermediate valve chamber without requiring any height in the control housing in addition to that needed for the surge valve unit. Also, the thermostatic valve unit is arranged on a slight incline with the valve end disposed quite close to the cooler core so as to provide ample space for the direct bypass chamber which is above it, and with the thermostat end at a greater height (which is possible, since the direct bypass chamber terminates short of the thermostat), thereby providing a space below the thermostat to accommodate the movement of a core check valve and leaving sufficient space below the projecting end of the thermostat to accommodate the attachment of the control housing to the body of the cooler. The foregoing features combine to provide a simple, compact and efficient control mechanism.

A reduction in the number of valve elements required for adequate core protection is effected by combining the warm up and core outlet streams within the cooler proper, having a common outlet for the jacket and core, and therefore employing only a single check valve for protecting both core and jacket from back surges.

A further object of the invention is to provide an improved thermostatic valve unit adapted to form a part of a control mechanism such as that outlined above. A specific object is to provide an improved thermo-responsive device utilizing the expansion of a wax such as paraffin for actuating the valve thermo-responsively. Another object is to provide such a thermo-responsive device in which the transfer of heat to the expansive liquid is attained at a maximum speed. Another object is to provide such a thermostatic valve unit in which the valve element is responsive not only to temperature change, but also to excessive pressures. A further object is to provide such a valve mechanism which may be readily removed as a unit from the control housing. Another object is to provide such a valve unit which incorporates a simple, yet effective, means for adjusting the thermostatic response.

Further objects and advantages of the invention will be brought out in the following part of the specification.

Referring to the drawings which are for illustrative purposes only,

Fig. 1 is a longitudinal vertical sectional view through a control mechanism embodying the invention, combined with a schematic showing of the flow circuit of the body of a cooler in which the invention is embodied;

Fig. 2 is a plan view of the control mechanism;

Fig. 3 is a detail sectional view taken longitudinally through the thermostat valve unit; and Fig. 4 is an end view of the thermostatic valve unit.

In the drawings I have indicated the control mechanism generally by the reference numeral 6 and the cooler body by the reference numeral 7. The cooler body 7 may be of a construction generally conforming to that shown in the application of Walter R. Ramsaur, Serial No. 383,731, filed March 17, 1941, now abandoned, for High capacity oil cooler, wherein a warm up jacket entirely surrounds the cooler core, or that shown in the application of Walter R. Ramsaur, Serial No. 568,018, filed December 13, 1944, now Patent No. 2,474,689, dated June 28, 1949, for Oil cooler, wherein the warm up bypass is abbreviated to cover a relatively small portion of the cooler shell. In either case, however, instead of employing a common inlet to the core and warm up bypass, with separate outlets therefrom, the cooler body 7 in the present invention will incorporate separate inlets 8 and 9 respectively to the core and warm up passages, and a common outlet 10. The cooler core may be provided with the conventional cylindrical shell 11 and a plurality of bundles of tubes 12 through which a coolant, such as air, may be passed through the core for cooling the oil passing through the interspaces 13 between the tubes 12. The warm up bypass is indicated at 14 and, as indicated, provides a relatively short and unconstricted bypass path of flow from the bypass inlet 9 to the common outlet 10. As previously stated, the warm up jacket or muff 14 may be in the form of either a jacket completely encircling the core or may be in the form of a relatively short and direct bypass extending longitudinally along the exterior of the core shell from the muff inlet 9 to the common outlet 10, with a baffle wall 15 therein to spread the flow to a greater extent longitudinally of the shell than would otherwise occur.

The control mechanism of my invention embodies the housing 16 having a top wall 17, a bottom wall 18 fitted against and secured to a fitting 19 of the cooler body 7, end walls 20 and 21, an internal wall 22 spaced below the top wall 17, an internal wall 23 spaced below the wall 22, side walls 24 and 24', and generally vertical partition walls 25, 26, and 27 spaced from each other longitudinally of the housing 16, each extending between the side walls 24 and 24' and joined thereto, the wall 25 extending between the walls 22 and 23 and joining the same, and the walls 26 and 27 extending between the walls 22 and 18 and joining the same, all cooperating to define an inlet chamber A, an inlet junction chamber B, a valve chamber C, and a combined direct bypass and outlet chamber D including a direct bypass chamber E and an outlet chamber F.

The inlet chamber A is disposed between the direct bypass chamber E and the inlet junction chamber B, is communicable with the direct bypass chamber E through a surge relief port 28 in the wall 22, and is normally in communication with the inlet junction chamber B through a port 29 in the wall 23. Oil enters the inlet chamber A through a main inlet port 30 in the side wall 24 (or an alternative inlet port in the other side wall 24', which is closed by a cover plate 31 when the inlet port 30 is being used. The alternative inlet ports are provided in order that the connection to the cooler from the engine and other parts of the lubrication circuit may be made from whichever side is best fitted for the particular installation).

From the inlet chamber A the oil stream normally passes into the junction chamber B and from there may pass through a port 32 in the bottom wall 18 and through the cooler inlet 8 registering therewith, into the cooler core; or may, under some conditions of operation, pass through a bypass control port 33 in the wall 26, into the bypass chamber C from which it may pass through a port 34 in the bottom wall 18 and through the warm up bypass inlet 9 which registers with the port 34, into the warm up bypass 14, or may divide in the junction chamber B and flow partially into the core inlet 8 and partially into the warm up bypass 14. Flow into the core is indicated by arrows 35, and the flow into and through the warm up bypass 14 is indicated by the arrows 36. After passing through the warm up bypass and core respectively, the oil streams join and pass out through the common outlet 10 and through an outlet port 37 in the bottom wall 18 of the control housing, registering with the outlet 10, into the outlet chamber F.

In the outlet chamber F, the oil washes the thermostat 38 of the valve unit 39 and then passes out through the main outlet 40 in the wall 24 (or its counterpart in the opposite wall 24', which is normally closed by a cover plate 41).

The thermostat 38 extends across substantially the full width of the outlet chamber F and is substantially centered in the direct line of flow from the port 37 to the main outlet port 40, whereby the discharging oil stream, throughout practically its entire breadth, is concentrated against the thermostat 38. Thus maximum effective response of the thermostat to changes in temperature in the discharging oil is obtained. Furthermore, the discharge flow will impinge against the same area of the thermostat 38 and have the same effectiveness of action thereon in relation to the amount of temperature change therein, whether it constitutes the discharge from the core or from the warm up bypass, or the combined discharge from both, mixed in the common outlet 10 of the cooler body before entering the outlet chamber F of the control unit. The combined outlet flow from the core and the warm up bypass and the outlet flow through the chamber F to the main outlet 40 is indicated by the arrows 42.

The valve unit 39 includes the thermostat 38, a valve element 43 controlled thereby and disposed in the valve chamber C in cooperative relation to the bypass control port 33, a head portion 44 by means of which the unit is mounted in an opening 86 in the end wall 21, and a sealing flange 46 which is closely fitted within an opening 47 in the wall 27 so as to permit the valve unit to extend from the outlet chamber F into the valve chamber C and yet to seal the two chambers against intercommunication. When the temperature is in normal operating range, the valve 43 will close the port 33 so as to direct the entire inlet flow through the core inlet 8 and through the core passages 13. At lower temperatures, the thermostat 38 will contract and withdraw the valve element 43 from the port 33, permitting flow through the bypass 14.

Under conditions where the oil begins to congeal on the walls of the tubes 12, the oil which continues to flow through the passages 13 will tend to retain its heat so as to have a higher temperature at the outlet than it would otherwise have, and this temperature may be such as to cause the valve 43 to close when it should be opened to permit a warm up flow of oil through the bypass jacket 14. Under such conditions, when the increase in pressure drop through the core, caused by the constriction of the passages 13 by the congealed layers of oil, becomes sufficiently excessive, the valve element 43 may yield with reference to the thermostat 38 in order to permit the bypass flow. For this purpose, the valve element 43 has a tubular hub member 48 which is slidably mounted on the stem 49 through which the thermo-responsive movement is transmitted to the valve element 43. Under ordinary conditions, the valve element 43 is maintained in fixed relation to the stem 49 by a spring 50 encircling the stem 49 and under compression between the valve element 43 and a washer 51, which abuts a shoulder 52 on the stem 49. Under excessive pressure mentioned above, the spring 50 will yield and permit the valve element 43 to slide on the stem 49.

Under extreme conditions of excess pressure or sudden surges in the inlet, the oil may bypass directly from the inlet chamber A to the outlet chamber F through the direct bypass chamber E. Such bypassing action is controlled by a surge valve unit indicated generally at 53 and comprising a surge relief valve element 54 normally closing the surge relief port 28. The valve element 54 has a skirt portion 55 slidably mounted in the bearing boss 56 in the top wall 17 of the control housing, and is normally maintained yieldingly in closed position by a coil spring 57, engaged under compression between the valve element 54 and an abutment spider 58 which is apertured so that the valve element 54 is subject to atmospheric pressure on its outer side. Carried by the valve element 54 is a stem 59 which in turn carries an inlet protection valve element 60 cooperating with the port 29 to isolate the inlet junction chamber B from the inlet chamber A when surges or other excessive pressure conditions, causing opening of the relief valve 54, occur. The above described specific constructions of the surge valve 53 do not in themselves form any part of the present invention which does, however, embrace the arrangement of the surge valve unit with the remaining elements of the control mechanism. Also, the present invention provides a specific improvement in the protection valve element 60, which is of laminated construction, including a thin metal disc, or discs, 61, sandwiched between and bonded to a pair of discs 62 and 63 of phenolic resin or equivalent plastic material. Interposed between the metal disc 61 and the plastic discs 62 and 63 are layers of soft rubber or equivalent material, an annular area of which is exposed between the edge of the disc 62 and the periphery of the disc 61, as indicated at 64, and which is adapted to make sealing contact with a seating surface on the wall 23 to close the port 29.

The outlet 10 is sealed off from back surges in the main outlet 40 by a check valve 65 which is hinged at 66 to the valve seat insert 67 in the bottom wall 18 of the control housing, against which insert the valve element 65 is adapted to seat. The invention provides an arrangement in which the single check valve protects both the core and the warm up bypass against back surges, whereas previously it has been necessary to employ two check valves for this purpose.

The invention provides an improved thermoresponsive valve unit in which the thermostat 38 comprises a casing member 68 (Fig. 3) having annular heat transfer fins 69 and a cylindrical bore 70, one end of the casing 68 being joined to the flange 46 by a narrow waist member 71 and the other end of the casing being closed by a cap 72 threaded thereinto at 73. The waist member 71 has a bore 74 which receives a piston 75 in the form of a head on the stem 49, separated from the stem by the shouuder 52. A pair of packing rings 76, in annular grooves 77 in the piston 75, seal the piston in the bore 74. Within the chamber defined by the bore 70, the waist member 71, the piston 75, and the cap 72, is sealed a thermo-expansive material such as paraffin which is relatively light in weight. For obtaining rapid distribution of heat from the casing 68 into the paraffin body I provide a series of thin discs 71' having rims 79 which maintain uniform spacing between the discs, said series of discs extending throughout the length of the chamber, although only a portion of the discs are shown in the drawing. These discs 71' are apertured at 80 to maintain communication between the spaces defined between the discs 71', permitting the body of liquid in said spaces to expand and contract, and to thereby move the piston 75 outwardly and permit it to return under the yielding pressure of a return spring 81, which is engaged between the washer 51 and a washer 82. The washer 82 in turn is abutted against a snap ring 83 mounted in an annular groove in a skirt 84 projecting from the flange 46.

The cap 72 is threaded into the thermostat head 44 forming a continuation of the casing 68, the head 44 being mounted in a bore 86 in the end wall 21 and having a rim flange 87 which is mounted in the opening 45 and secured by a snap ring 88. By rotating the cap 72, the volume of the thermo-responsive fluid chamber may be changed so as to change the setting of the valve element 43 relative to the thermostat. The cap 72 is sealed by a packing ring 89 mounted in an annular groove 90 in the cap and engaging a conical counterbore 91 in the head 44. For locking the cap 72 in any desired position of adjustment I provide a locking screw 92 having a conical shoulder portion 93 engageable between the walls of a slot 94 in the cap, and adapted to spread the adjacent portions of the cap into locking engagement with the head 44 when the screw 92 is tightened, the inner ends of the screw being threaded into the cap 72.

Since the valve portion of the valve unit is disposed in an inlet chamber while the thermostat portion thereof is disposed in an outlet chamber, the entire valve unit may occupy roughly two-thirds of the length of the control housing. This makes it possible to embody ample area in the thermostat, and the valve portion to be amply large to accommodate the spring mechanism. It brings the valve element 43 up to the inlet junction chamber, where it may control the flow at the inlet rather than at the outlet. The valve element 43 is, in its excess pressure responsive action, responsive directly to inlet pressure rather than the lower pressure existing at the outlet of the bypass. The excess pressure response is therefore more effective and gives greater relief to the core from excess pressures than is possible when the valve is located at the outlet. The extension of the valve unit through both the outlet and bypass chambers is made possible by arranging the valve in a position roughly horizontal to the major axis of the cooler body 7, and this in turn makes it possible to keep the height of the top wall 17 above the bottom wall 18 of the control housing at a minimum. The arrangement of the valve unit at a slight acute angle relative to the bottom wall makes it possible to bring the valve element 43 close to the bottom wall 18, leaving an adequate space for the direct bypass chamber E, while the thermostat 38 is located at a greater height from the bottom wall 18, so as to provide room for operation of the check valve 65. At the same time the thermostat 38 is substantially centered between the top and bottom walls 17 and 18 and therefore directly in front of the main outlet 40, which likewise is substantially thus centered. The fins 69 are so arranged that the flow from the outlet 10 to the main outlet 40 is substantially parallel to the planes of the fins and wipes them with maximum heat transfer effect.

Briefly reviewing the operation of the cooler, under normal temperature conditions, oil will flow into the inlet chamber A through the main inlet 30, then through the port 29 into the junction chamber B, thence through the port 32 into the core inlet 8, thence through the core passages 13 to the common outlet 10, then through the port 37 and past the check valve 65 into the outlet chamber F, then past the thermostat 38 to the main outlet 40. In response to the temperature of the outflowing oil, the thermostat 38 will maintain the valve 43 in a position closing the port 33 and directing the flow through the core. This action of the thermostat results from expansion of the paraffin confined between the discs 71', such expansion being transmitted to the piston 75, thence through the shoulder 52 to the washer 51, and thence through the spring 50 to the valve element 43 to hold the latter seated in the port 33. In the event the temperature of the outflowing oil drops below the normal operating range, the contraction of the paraffin between the discs 71 will permit the piston 75 to be retracted by the pressure of the light spring 81 acting through the washer 51 against the shoulder 52, and the valve element 43, which is retained on the stem 49 by a retainer nut 96, will recede with the valve stem to open position, permitting the flow to divide in the junction chamber B and pass partly through the core and partly through the warm up bypass 14. If the temperature drops to a sufficiently low degree, and the thickening of the oil in the core progresses to a sufficient extent, the flow through the core may substantially stop and all of the flow be passed through the bypass 14 so as to provide maximum warming effect. In this case, the temperature of the outflowing oil may possibly rise while the oil in the core continues to thicken, and in such an event the action of the thermostat 38, in tending to return the valve 43 to a closed position, may be offset by yielding of the spring 50 under the excess pressure differential thus produced, permitting the valve element 43 to slide on the stem 49 and thereby maintain or arrive at an open position. The same result would obtain upon starting the operation of the system after a period of disuse in which the oil has thickened in the cooler so as to produce a high core resistance.

In the event the pressure differential rises to an extreme level, or in the event of sudden pressure surges in the inlet 30, the surge valve 53 may come into operation to open the port 28 and close the port 29, as described hereinbefore, thus permitting a direct bypass from the inlet chamber A through the bypass chamber E to the outlet chamber F.

I claim as my invention:

1. Control mechanism for an oil cooler including a cooler core and a bypass arranged in parallel with separate inlets and a common outlet, comprising: a control housing having an inlet chamber communicating with the core inlet, a valve chamber communicating with the bypass inlet and communicable with the inlet chamber, and an outlet chamber communicable with said common outlet, having a main outlet for the discharge of oil from the cooler and separated from said valve chamber by a common partition wall having an opening therein; a thermo-responsive valve unit including aligned thermo-responsive and valve elements and a casing member including a flange disposed between said elements and substantially filling said partition wall opening, with said thermostat element disposed in said discharge chamber in the path of flow from said common outlet to said main outlet and having heat transfer fins substantially parallel to said path of flow and extending throughout the majority of the width of said discharge chamber, and with said valve element disposed in said valve chamber and cooperable with a bypass control port between said valve chamber and said inlet chamber and adapted, when the temperature of the oil flowing through said discharge chamber is within a normal operating range, to be moved by said thermostat to a position controlling said last mentioned port and thereby preventing flow through said bypass and, when said temperature is below said normal operating range, to be moved to an open position permitting flow through said bypass.

2. Control mechanism for an oil cooler having a cooler core and a bypass arranged in parallel with separate inlets and a common outlet, comprising: a control housing having an inlet chamber in communication with the core inlet, a valve chamber in communication with said bypass inlet and communicable with said inlet chamber through a bypass control port, a discharge chamber communicable with said common outlet and having a main outlet for the discharge of oil from the cooler, and a direct bypass chamber, one end of which is communicable with said inlet chamber through a surge control port and the other end of which is in communication with said outlet chamber, said inlet chamber, valve chamber, and discharge chamber being arranged in aligned relationship in the order named, said direct bypass chamber being extended longitudinally of said control housing above said inlet and valve chambers; a protective check valve hinged to said control housing within said outlet chamber, adjacent the bottom thereof, said check valve controlling the flow between the cooler core and said outlet chamber and adapted to close under any reverse surge through said outlet chamber from said main outlet; and a thermo-responsive valve unit including a thermostat element in said outlet chamber and a valve element in said valve chamber cooperable with said bypass control port to control the flow of oil through said bypass, the axis of said valve and said thermostat element being substantially inclined at an acute angle to the longitudinal axis of the control housing with the valve disposed nearer the cooler core and the thermostat element disposed farther from the cooler core to thereby provide sufficient room in the lower part of the outlet chamber to permit the check valve to swing upwardly within the outlet chamber and allow the flow of oil into said outlet chamber from the cooler core.

3. Control mechanism for an oil cooler having a cooler core and a bypass arranged in parallel with separate inlets and a common outlet, comprising: a control housing having an inlet chamber in communication with the core inlet, a valve chamber in communication with said bypass inlet and communicable with said inlet chamber through a bypass control port, a discharge chamber communicable with said common outlet and having a main outlet for the discharge of oil from the cooler, and a direct bypass chamber, one end of which is communicable with said inlet chamber through a surge control port and the other end of which is in communication with said outlet chamber, said inlet chamber, valve chamber, and discharge chamber being arranged in aligned relationship in the order named, said inlet and valve chambers being of less height than said discharge chamber and said direct bypass chamber being extended longitudinally of said control housing above said inlet and valve chambers; a check valve hinged to the control housing within an outlet chamber and adjacent the bottom of said housing, said valve being adapted to swing upwardly when oil is flowing from the cooler core into said outlet chamber and to close under any reverse surge in said outlet chamber from said main outlet; and a thermo-responsive valve unit including a thermostat element in said outlet chamber and a valve element in said valve chamber cooperable with said bypass control port to control the flow of oil through said bypass, said thermostat and valve element being on a common axis which is substantially inclined at an acute angle to the longitudinal axis of the control housing, with the valve disposed nearer the cooler core and the thermostat element disposed farther from the cooler core to provide sufficient opening movement of the check valve for adequate flow of oil from the cooler core into said outlet chamber.

4. Control mechanism for an oil cooler including a cooler core and a bypass arranged in parallel with separate inlets and a common outlet, comprising: a control housing having an inlet chamber communicating with the core inlet, a valve chamber communicating with the bypass inlet and communicable with the inlet chamber, an outlet chamber communicable with said common outlet, having a main outlet for the discharge of oil from the cooler and separated from said valve chamber by a common partition wall having an opening therein, and a direct bypass chamber, one end of which is communicable with said inlet chamber through a surge control port and the other end of which is in communication with said outlet chamber; a thermo-responsive valve unit including aligned thermo-responsive and valve elements and a casing member including a flange disposed between said elements and substantially filling said partition wall opening, with said thermostat element disposed in said discharge chamber in the path of flow from said common outlet to said main outlet and with said valve element disposed in said valve chamber and cooperable with a bypass control port between said valve chamber and said inlet chamber, said direct bypass chamber connecting with the discharge chamber at a point adjacent to and above said flange.

5. Control mechanism for an oil cooler having a cooler core and a bypass arranged in parallel with separate inlets and a common outlet, comprising: a control housing having an inlet chamber in communication with the core inlet, a valve chamber in communication with said bypass inlet and communicable with said inlet chamber through a bypass control port, and a discharge chamber communicable with said common outlet and having a main outlet for the discharge of oil from the cooler, said inlet chamber, valve chamber and discharge chamber being arranged in aligned relationship in the order named; a hinged protective check valve within said outlet chamber and located adjacent the bottom thereof, said check valve being adapted to close under any reverse surge through the outlet chamber from said main outlet; and a thermo-responsive valve unit including a thermostat element in said outlet chamber and a valve element in said valve chamber cooperable with said bypass control port to control the flow of oil through said bypass, the axis of said valve and thermostat elements being substantially inclined at an acute angle to the longitudinal axis of the control housing with the valve disposed nearer the cooler core and the thermostat element disposed farther from said cooler core to provide room for adequate opening of said check valve.

6. Control mechanism for an oil cooler including a cooler core and a bypass arranged in parallel with separate inlets and a common outlet, comprising: a control housing having an inlet chamber communicating with the core inlet, a valve chamber communicating with the bypass inlet and communicable with the inlet chamber, and an outlet chamber communicable with said common outlet, having a main outlet for the discharge of oil from the cooler and separated from said valve chamber by a common partition wall having an opening therein; and a thermo-responsive valve unit including aligned thermo-responsive and valve elements and a casing member including a flange disposed between said elements and substantially filling said partition wall opening, with said thermostat element disposed in said discharge chamber in the path of flow from said common outlet to said main outlet, and with said valve element disposed in said valve chamber and cooperable with a bypass control port between said valve chamber and said inlet chamber and adapted, when the temperature of the oil flowing through said discharge chamber is within a normal operating range, to be moved by said thermostat to a position controlling said last mentioned port and thereby preventing flow through said bypass and, when said temperature is below said normal operating range, to be moved to an open position permitting flow through said bypass.

7. Control mechanism for an oil cooler including a cooler core and a bypass arranged in parallel with separate inlets and a common outlet, comprising: a control housing having an inlet chamber communicating with the core inlet, a valve chamber communicating with the bypass inlet and communicable with the inlet chamber, and an outlet chamber communicable with said common outlet, having a main outlet for the discharge of oil from the cooler and separated from said valve chamber by a common partition wall having an opening therein; and a thermo-responsive valve unit including aligned thermo-responsive and pressure responsive valve elements and a casing member including a flange disposed between said elements and substantially filling said partition wall opening, with said thermostat element disposed in said discharge chamber in the path of flow from said common outlet to said main outlet, and with said valve element disposed in said valve chamber and cooperable with a bypass control port between said valve chamber and said inlet chamber and adapted, when the temperature of the oil flowing through said discharge chamber is within a normal operating range, to be moved by said thermostat to a position controlling said last mentioned port and thereby preventing flow through said bypass and, when said temperature is below said normal operating range, to be moved to an open position permitting flow through said bypass, said valve element yielding under surges of excess pressure in the inlet chamber to permit flow from the inlet chamber to the valve chamber.

RAYMOND W. JENSEN.

REFERENCES CITED

The following references are of record in the file of this patent:

UNITED STATES PATENTS

| Number | Name | Date |
|---|---|---|
| 332,150 | Holmes | Dec. 8, 1885 |
| 822,983 | Rhoda | June 12, 1906 |
| 1,359,107 | Roesch | Nov. 16, 1920 |
| 1,540,501 | Rogers | June 2, 1925 |
| 2,021,282 | Blanchard | Nov. 19, 1935 |
| 2,035,512 | Smith | Mar. 31, 1936 |
| 2,288,599 | Ramsaur | July 7, 1942 |
| 2,344,207 | Hannon | Mar. 14, 1944 |
| 2,353,577 | Magrum | July 11, 1944 |
| 2,359,448 | Shaw | Oct. 3, 1944 |
| 2,364,659 | Ray | Dec. 12, 1944 |
| 2,374,639 | Miller | Apr. 24, 1945 |
| 2,379,109 | Shaw | June 26, 1945 |
| 2,396,053 | McEntire | Mar. 5, 1946 |
| 2,433,420 | Booth | Dec. 30, 1947 |

FOREIGN PATENTS

| Number | Country | Date |
|---|---|---|
| 553,892 | Great Britain | June 9, 1943 |